US009128912B2

(12) United States Patent
Kamiya

(10) Patent No.: US 9,128,912 B2
(45) Date of Patent: Sep. 8, 2015

(54) EFFICIENT XML INTERCHANGE SCHEMA DOCUMENT ENCODING

(75) Inventor: Takuki Kamiya, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 476 days.

(21) Appl. No.: 13/554,862

(22) Filed: Jul. 20, 2012

(65) Prior Publication Data

US 2014/0026029 A1    Jan. 23, 2014

(51) Int. Cl.
*G06F 17/00* (2006.01)
*G06F 17/22* (2006.01)

(52) U.S. Cl.
CPC ........ *G06F 17/2205* (2013.01); *G06F 17/2247* (2013.01); *G06F 17/2258* (2013.01)

(58) Field of Classification Search
CPC .................................................. G06F 17/2247
See application file for complete search history.

(56) References Cited

U.S. PATENT DOCUMENTS

| 7,111,076 | B2 * | 9/2006 | Abjanic et al. | 709/246 |
|---|---|---|---|---|
| 7,143,346 | B2 * | 11/2006 | Dunne et al. | 715/234 |
| 7,581,177 | B1 * | 8/2009 | Mollicone et al. | 715/243 |
| 7,587,667 | B2 * | 9/2009 | Scardina et al. | 715/230 |
| 7,603,654 | B2 * | 10/2009 | Kharitidi et al. | 717/106 |
| 7,886,223 | B2 * | 2/2011 | Shetty et al. | 715/234 |
| 7,933,928 | B2 * | 4/2011 | Chandrasekar et al. | 707/802 |
| 7,992,081 | B2 * | 8/2011 | Medi et al. | 715/237 |
| 8,156,213 | B1 * | 4/2012 | Deng et al. | 709/223 |
| 8,185,565 | B2 * | 5/2012 | Ishizaki | 707/809 |
| 8,191,040 | B2 * | 5/2012 | Hejlsberg et al. | 717/114 |
| 8,250,062 | B2 * | 8/2012 | Zhang et al. | 707/713 |
| 8,250,465 | B2 * | 8/2012 | Uchida | 715/234 |
| 8,606,806 | B2 * | 12/2013 | Baras et al. | 707/761 |
| 8,713,426 | B2 * | 4/2014 | Idicula et al. | 715/235 |
| 8,943,481 | B2 * | 1/2015 | Gharavy et al. | 717/137 |
| 2003/0046317 | A1 * | 3/2003 | Cseri et al. | 707/513 |
| 2005/0091346 | A1 * | 4/2005 | Krishnaswami et al. | 709/220 |
| 2005/0132276 | A1 * | 6/2005 | Panditharadhya et al. | 715/513 |
| 2006/0059169 | A1 * | 3/2006 | Armishev | 707/100 |
| 2006/0085489 | A1 * | 4/2006 | Tomic et al. | 707/200 |
| 2006/0182138 | A1 * | 8/2006 | Kamiya | 370/452 |
| 2006/0184547 | A1 * | 8/2006 | Kamiya | 707/100 |
| 2006/0184562 | A1 * | 8/2006 | Kamiya | 707/102 |
| 2006/0184873 | A1 * | 8/2006 | Kamiya | 715/513 |
| 2006/0184874 | A1 * | 8/2006 | Kimiya | 715/513 |
| 2006/0212799 | A1 * | 9/2006 | Kamiya | 715/513 |
| 2006/0212800 | A1 * | 9/2006 | Kamiya | 715/513 |
| 2006/0218161 | A1 * | 9/2006 | Zhang et al. | 707/100 |

(Continued)

OTHER PUBLICATIONS

World Wide Web Consortium. Extensible Markup Language (XML) 1.0 (Fifth Edition), ed. Tim Bray et al. W3C Recommendation Nov. 26, 2008. http://www.w3.org/TR/xml/.

(Continued)

*Primary Examiner* — Scott Baderman
*Assistant Examiner* — Barbara Level
(74) *Attorney, Agent, or Firm* — Maschoff Brennan

(57) ABSTRACT

A method of reducing the size of a simpleType element in an Efficient XML Interchange (EXI) schema document may include modifying each simpleType element in an XSD document by eliminating one or more facets from each simpleType element. The method may also include encoding the XSD document into an EXI schema document by transforming each modified simpleType element in the XSD document from an XSD simpleType element with start and end tags to an encoded EXI simpleType element expressed as a sequence of bits.

20 Claims, 13 Drawing Sheets

(56) References Cited

U.S. PATENT DOCUMENTS

| | | | |
|---|---|---|---|
| 2007/0005786 A1* | 1/2007 | Kumar et al. | 709/230 |
| 2007/0061706 A1* | 3/2007 | Cupala et al. | 715/513 |
| 2007/0136221 A1* | 6/2007 | Sweeney et al. | 706/20 |
| 2007/0143664 A1* | 6/2007 | Fang et al. | 715/513 |
| 2007/0162479 A1* | 7/2007 | Begun et al. | 707/101 |
| 2008/0017722 A1* | 1/2008 | Snyder et al. | 235/494 |
| 2008/0104579 A1* | 5/2008 | Hartmann | 717/136 |
| 2008/0120351 A1* | 5/2008 | Khaladkar et al. | 707/204 |
| 2008/0183736 A1* | 7/2008 | Westerinen et al. | 707/101 |
| 2008/0306971 A1* | 12/2008 | Martinez Smith et al. | 707/100 |
| 2009/0132569 A1* | 5/2009 | Tamiya | 707/101 |
| 2009/0150412 A1* | 6/2009 | Idicula et al. | 707/100 |
| 2009/0198722 A1* | 8/2009 | Hanson et al. | 707/102 |
| 2009/0210783 A1* | 8/2009 | Bellessort | 715/234 |
| 2009/0271695 A1* | 10/2009 | Ruellan et al. | 715/227 |
| 2009/0287625 A1* | 11/2009 | Fablet et al. | 706/45 |
| 2010/0010995 A1* | 1/2010 | Fablet et al. | 707/6 |
| 2010/0058169 A1* | 3/2010 | Demant et al. | 715/234 |
| 2010/0058170 A1* | 3/2010 | Demant et al. | 715/234 |
| 2010/0083101 A1* | 4/2010 | Denoual et al. | 715/242 |
| 2010/0153837 A1* | 6/2010 | Bellessort et al. | 715/234 |
| 2010/0318370 A1* | 12/2010 | Bhattacharyya et al. | 705/1.1 |
| 2011/0010614 A1* | 1/2011 | Fablet et al. | 715/234 |
| 2011/0153531 A1* | 6/2011 | Ishizaki | 706/12 |
| 2012/0124017 A1* | 5/2012 | Heuer et al. | 707/693 |
| 2012/0134287 A1* | 5/2012 | Turunen et al. | 370/252 |
| 2012/0150828 A1* | 6/2012 | Fablet et al. | 707/693 |
| 2012/0159306 A1* | 6/2012 | Sharma et al. | 715/234 |
| 2012/0233573 A1* | 9/2012 | Sullivan et al. | 715/848 |
| 2012/0254725 A1* | 10/2012 | Doi | 715/234 |
| 2013/0018924 A1* | 1/2013 | Connor et al. | 707/804 |
| 2013/0069806 A1* | 3/2013 | Oh et al. | 341/95 |
| 2013/0103721 A1* | 4/2013 | Doi et al. | 707/802 |
| 2013/0104033 A1* | 4/2013 | Doi et al. | 715/234 |
| 2013/0339526 A1* | 12/2013 | Ruellan et al. | 709/226 |
| 2014/0026029 A1* | 1/2014 | Kamiya | 715/234 |
| 2014/0026030 A1* | 1/2014 | Kamiya | 715/234 |
| 2014/0070966 A1* | 3/2014 | Fablet et al. | 341/55 |
| 2014/0281912 A1* | 9/2014 | Doi | 715/234 |
| 2014/0297692 A1* | 10/2014 | Doi | 707/803 |

OTHER PUBLICATIONS

World Wide Web Consortium. Efficient XML Interchange (EXI) Format 1.0, ed. John Schneider et al. W3C Recommendation Mar. 10, 2011. http://www.w3.org/TR/exi/.

World Wide Web Consortium. W3C XML Schema Definition Language (XSD) 1.1 Part 1: Structures, ed. Henry S. Thompson et al. W3C Recommendation Apr. 5, 2012. http://www.w3.org/TR/xmlschema11-1/.

World Wide Web Consortium. W3C XML Schema Definition Language (XSD) 1.1 Part 2: Datatypes, ed. David Peterson et al. W3C Recommendation Apr. 5, 2012. http://www.w3.org/TR/xmlschema11-2/.

World Wide Web Consortium. Efficient XML Interchange (EXI) Profile, ed. Youenn Fablet et al. W3C Working Draft. Apr. 10, 2012. http://www.w3.org/TR/exi-profile/.

* cited by examiner

```
public static final int NODE_TYPE = 0;
public static final int TYPE_NAME = 1;
public static final int TYPE_TARGET_NAMESPACE = 2;
public static final int TYPE_NUMBER = 3;
public static final int TYPE_GRAMMAR = 4;
public static final int SIMPLE_TYPE_AUX = 5;
public static final int SIMPLE_TYPE_FIELD_INT = 6;
public static final int SIMPLE_TYPE_NEXT_SIMPLE_TYPE = 7;
```

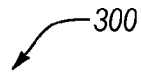

```
static final int NODE_TYPE = 0;
static final int TYPE_NAME = 1;
static final int TYPE_TARGET_NAMESPACE = 2;
static final int TYPE_NUMBER = 3;
static final int TYPE_BASE_TYPE = 4;
static final int TYPE_BOOLEANS = 5;
static final int TYPE_ISURTYPE_MASK = 0x0001;
static final int TYPE_ISFIXTURE_MASK = 0x0002;
static final int SIMPLE_TYPE_VARIETY = 6; // atomic, list or union
static final int SIMPLE_TYPE_AUX_TYPE = 7;
static final int SIMPLE_TYPE_BOOLEANS = 8;
static final int SIMPLE_TYPE_ISBUILTIN_MASK = 0x0001;
static final int SIMPLE_TYPE_ISPRIMITIVE_MASK = 0x0002;
static final int SIMPLE_TYPE_ISNUMERIC_MASK = 0x0004;
static final int SIMPLE_TYPE_ISLIST_CONTENT_MASK = 0x0008;
static final int SIMPLE_TYPE_ISENUM_CONTENT_MASK = 0x0010;
static final int SIMPLE_TYPE_ISEMPTIABLE_MASK = 0x0020;
static final int SIMPLE_TYPE_FACET_LENGTH = 9; // int
static final int SIMPLE_TYPE_FACET_MINLENGTH = 10; // int
static final int SIMPLE_TYPE_FACET_MAXLENGTH = 11; // int
static final int SIMPLE_TYPE_FACET_WHITESPACE = 12; // int
static final int SIMPLE_TYPE_FACET_MAXINCLUSIVE = 13; // variant
static final int SIMPLE_TYPE_FACET_MAXEXCLUSIVE = 14; // variant
static final int SIMPLE_TYPE_FACET_MINEXCLUSIVE = 15; // variant
static final int SIMPLE_TYPE_FACET_MININCLUSIVE = 16; // variant
static final int SIMPLE_TYPE_FACET_TOTALDIGITS = 17; // int
static final int SIMPLE_TYPE_FACET_FRACTIONDIGITS = 18; // int
static final int SIMPLE_TYPE_N_FACET_PATTERNS = 19; // int
static final int SIMPLE_TYPE_N_FACET_ENUMERATIONS = 20; // int
static final int SIMPLE_TYPE_N_MEMBER_TYPES = 21;
static final int SIMPLE_TYPE_NEXT_SIMPLE_TYPE = 22;
```

*Fig. 3*
*Prior Art* boolean_Sample

| | Field | Byte 0 | Byte 1 | Byte 3 | Byte 4 | Decimal Value | Value |
|---|---|---|---|---|---|---|---|
| int[addr] | Node Type | 00000000 | 00000000 | 00000001 | 00000001 | 257 | Simple Type |
| int[addr+1] | Name | 00000000 | 00000000 | 00000000 | 00000001 | 1 | boolean_Sample |
| int[addr+2] | URI | 00000000 | 00000000 | 00000000 | 00000100 | 4 | urn:foo |
| int[addr+3] | Type Serial Number | 00000000 | 00000000 | 00000000 | 00110010 | 50 | 50 |
| int[addr+4] | Grammar Address | 00000000 | 00000000 | 00000011 | 11010000 | 976 | 976 |
| int[addr+5] | Auxiliary Bits | 00000000 | 00000000 | 00000001 | 00011001 | 281 | Composite Value 281 |
| int[addr+6] | Base Type | 00000000 | 00000000 | 00000000 | 00010111 | 23 | xsd:boolean |
| int[addr+7] | Next Simple Type Address | 00000000 | 00000000 | 00000001 | 11000111 | 455 | 455 |

*Fig. 7* integer_Sample

| | Field | Byte 0 | Byte 1 | Byte 3 | Byte 4 | Decimal Value | Value |
|---|---|---|---|---|---|---|---|
| int[addr] | Node Type | 00000000 | 00000000 | 00000001 | 00000001 | 257 | Simple Type |
| int[addr+1] | Name | 00000000 | 00000000 | 00000000 | 00000100 | 4 | integer_Sample |
| int[addr+2] | URI | 00000000 | 00000000 | 00000000 | 00000100 | 4 | urn:foo |
| int[addr+3] | Type Serial Number | 00000000 | 00000000 | 00000000 | 00110000 | 48 | 48 |
| int[addr+4] | Grammar Address | 00000000 | 00000000 | 00000011 | 10101010 | 938 | 938 |
| int[addr+5] | Auxiliary Bits | 00000000 | 00001011 | 00000110 | 10101001 | 722601 | Composite Value 722601 |
| int[addr+6] | Base Type | 00000000 | 00000000 | 00000000 | 10111001 | 185 | xsd:integer |
| int[addr+7] | Next Simple Type Address | 00000000 | 00000000 | 00000001 | 10110101 | 437 | 437 |

*Fig. 8* string_Sample

| | Field | Byte 0 | Byte 1 | Byte 3 | Byte 4 | Decimal Value | Value |
|---|---|---|---|---|---|---|---|
| int[addr] | Node Type | 00000000 | 00000000 | 00000001 | 00000001 | 257 | Simple Type |
| int[addr+1] | Name | 00000000 | 00000000 | 00000000 | 00000110 | 6 | string_Sample |
| int[addr+2] | URI | 00000000 | 00000000 | 00000000 | 00000100 | 4 | urn:foo |
| int[addr+3] | Type Serial Number | 00000000 | 00000000 | 00000000 | 00110100 | 52 | 52 |
| int[addr+4] | Grammar Address | 00000000 | 00000000 | 00000011 | 11110110 | 1014 | 1014 |
| int[addr+5] | Auxiliary Bits | 00000000 | 00000000 | 00101001 | 00010001 | 10513 | Composite Value 10513 |
| int[addr+6] | Base Type | 00000000 | 00000000 | 00000000 | 00001110 | 14 | xsd:string |
| int[addr+7] | Next Simple Type Address | 11111111 | 11111111 | 11111111 | 11111111 | -1 | none |

*Fig. 9* string_Sample

| | Field | Byte 0 | Byte 1 | Byte 3 | Byte 4 | Decimal Value | Value |
|---|---|---|---|---|---|---|---|
| int[addr] | Node Type | 00000000 | 00000000 | 00000001 | 00000001 | 257 | Simple Type |
| int[addr+1] | Name | 00000000 | 00000000 | 00000000 | 00010000 | 16 | string_Sample |
| int[addr+2] | URI | 00000000 | 00000000 | 00000000 | 00000011 | 3 | urn:foo |
| int[addr+3] | Type Serial Number | 00000000 | 00000000 | 00000000 | 00110100 | 52 | 52 |
| int[addr+4] | Base Type Address | 00000000 | 00000000 | 00000000 | 10001011 | 139 | xsd:string |
| int[addr+5] | Type Boolean Bits | 00000000 | 00000000 | 00000000 | 00000000 | 0 | Composite Value 0 |
| int[addr+6] | Variety | 00000000 | 00000000 | 00000000 | 00000010 | 2 | atomic |
| int[addr+7] | Built-in Type Address | 00000000 | 00000000 | 00000000 | 10001011 | 139 | xsd:string |

| | | | | | Composite Value 0 |
|---|---|---|---|---|---|
| int[addr+8] | SimpleType Boolean Bits | 00000000 | 00000000 | 00000000 | 0 |
| int[addr+9] | Length Facet | 11111111 | 11111111 | 11111111 | -1 | none |
| int[addr+10] | minLength Facet | 11111111 | 11111111 | 11111111 | -1 | none |
| int[addr+11] | maxLength Facet | 11111111 | 11111111 | 11111111 | -1 | none |
| int[addr+12] | whiteSpace Facet | 00000000 | 00000000 | 00000000 | 0 | preserve |
| int[addr+13] | maxInclusive Facet | 11111111 | 11111111 | 11111111 | -1 | none |
| int[addr+14] | maxExclusive Facet | 11111111 | 11111111 | 11111111 | -1 | none |
| int[addr+15] | minExclusive Facet | 11111111 | 11111111 | 11111111 | -1 | none |
| int[addr+16] | minInclusive Facet | 11111111 | 11111111 | 11111111 | -1 | none |

*Fig. 10B*
*Prior Art*

| | Continued On 10B | | | Continued On 10B | |
|---|---|---|---|---|---|
| int[addr+17] | totalDigits Facet | 11111111 | 11111111 | 11111111 | -1 | none |
| int[addr+18] | fractionDigits Facet | 11111111 | 11111111 | 11111111 | -1 | none |
| int[addr+19] | # of RCS | 00000000 | 00000000 | 00001010 | 10 | 10 (i.e.-0-9) |
| int[addr+20] | # of Enumerations | 00000000 | 00000000 | 00000000 | 0 | 0 |
| int[addr+21] | # of Member Types | 00000000 | 00000000 | 00000000 | 0 | 0 |
| int[addr+22] | Next Simple Type Address | 11111111 | 11111111 | 11111111 | -1 | none |

Fig. 10C
*Prior Art*

EFFICIENT XML INTERCHANGE SCHEMA DOCUMENT ENCODING

FIELD

The embodiments discussed herein are related to Efficient XML Interchange (EXI) schema documents.

BACKGROUND

Extensible Markup Language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of grammatical rules governing the order of elements, boolean predicates associated with the content, data types governing the content of elements and attributes, and more specialized rules such as uniqueness and referential integrity constraints. One example schema language in widespread use is the XML Schema Definition (XSD) language as defined in the XSD 1.1 Specification produced by the W3C and dated Apr. 5, 2012, which is incorporated herein by reference in its entirety.

The process of checking to see if an XML document conforms to an XSD document is called validation, which is separate from XML's core concept of syntactic well-formedness. All XML documents are defined as being well-formed, but an XML document is on check for validity where the XML processor is "validating," in which case the document is checked for conformance with its associated XSD document. An XML document is only considered valid if it satisfies the requirements of the XSD document with which it has been associated.

Although the plain-text human-readable aspect of XML and XSD documents may be beneficial in many situations, this human-readable aspect may also lead to XML and XSD documents that are large in size and therefore incompatible with devices with limited memory or storage capacity. Efforts to reduce the size of XML and XSD documents have therefore often eliminated this plain-text human-readable aspect in favor of more compact binary representations.

EXI is a Binary XML format. EXI is one of the most prominent binary XML efforts to encode XML documents in a binary data format rather than plain text. In general, using a binary XML format reduces the size and verbosity of XML documents, and may reduce the cost in terms of time and effort involved in parsing XML documents. EXI is formally defined in the EXI Format 1.0 Specification produced by the W3C and dated Mar. 10, 2011, which is incorporated herein by reference in its entirety. An XML document may be encoded in an EXI format as a separate EXI document. An XSD document may also be encoded as a separate EXI schema document.

When an XSD document is encoded as an EXI schema document, the EXI schema document generally includes various encoded data fields that are employed in validation tasks. Unfortunately, however, the inclusion of these various encoded data fields may cause the size of the EXI schema document to remain relatively large in size. This relatively large size may be problematic where the EXI schema document is transferred to an EXI processor that is employed in a device with limited memory or storage capacity.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of reducing the size of a simpleType element in an EXI schema document may include modifying each simpleType element in an XSD document by eliminating one or more facets from each simpleType element. The method may also include encoding the XSD document into an EXI schema document by transforming each modified simpleType element in the XSD document from an XSD simpleType element with start and end tags to an encoded EXI simpleType element expressed as a sequence of bits.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates a prior art EXI schema simpleType datatype;

FIG. 7 illustrates an example atomic boolean simpleType element of the XSD document of FIG. 6 that has been encoded according to the example EXI schema datatype of FIG. 2;

FIG. 8 illustrates an example atomic integer simpleType element of the XSD document of FIG. 6 that has been encoded according to the example EXI schema datatype of FIG. 2;

FIG. 9 illustrates an example atomic string simpleType element of the XSD document of FIG. 6 that has been encoded according to the example EXI schema datatype of FIG. 2; and FIGS. 10A-10C illustrate an example string element of the XSD document of FIG. 6 that has been encoded according to the prior art EXI schema datatype of FIG. 3.

DESCRIPTION OF EMBODIMENTS

Some embodiments described herein may include methods of reducing the size of a simpleType element in an EXI schema document. For example, some embodiments described herein may include a method of reducing the size of a simpleType element in an EXI schema document where the EXI schema document is targeted for non-validation tasks. Because validation tasks employ validation-specific data fields of a simpleType element, where an EXI schema document is targeted for a non-validation task, the size of the simpleType element in the EXI schema document may be reduced by eliminating these validation-specific data fields.

As used herein, the term "document" refers to any electronic document, stream, or file. Therefore, as used herein, the phrase "EXI schema document" is synonymous with "EXI schema stream" or "EXI schema file."

Embodiments of the present invention will be explained with reference to the accompanying drawings.

Figure 1:
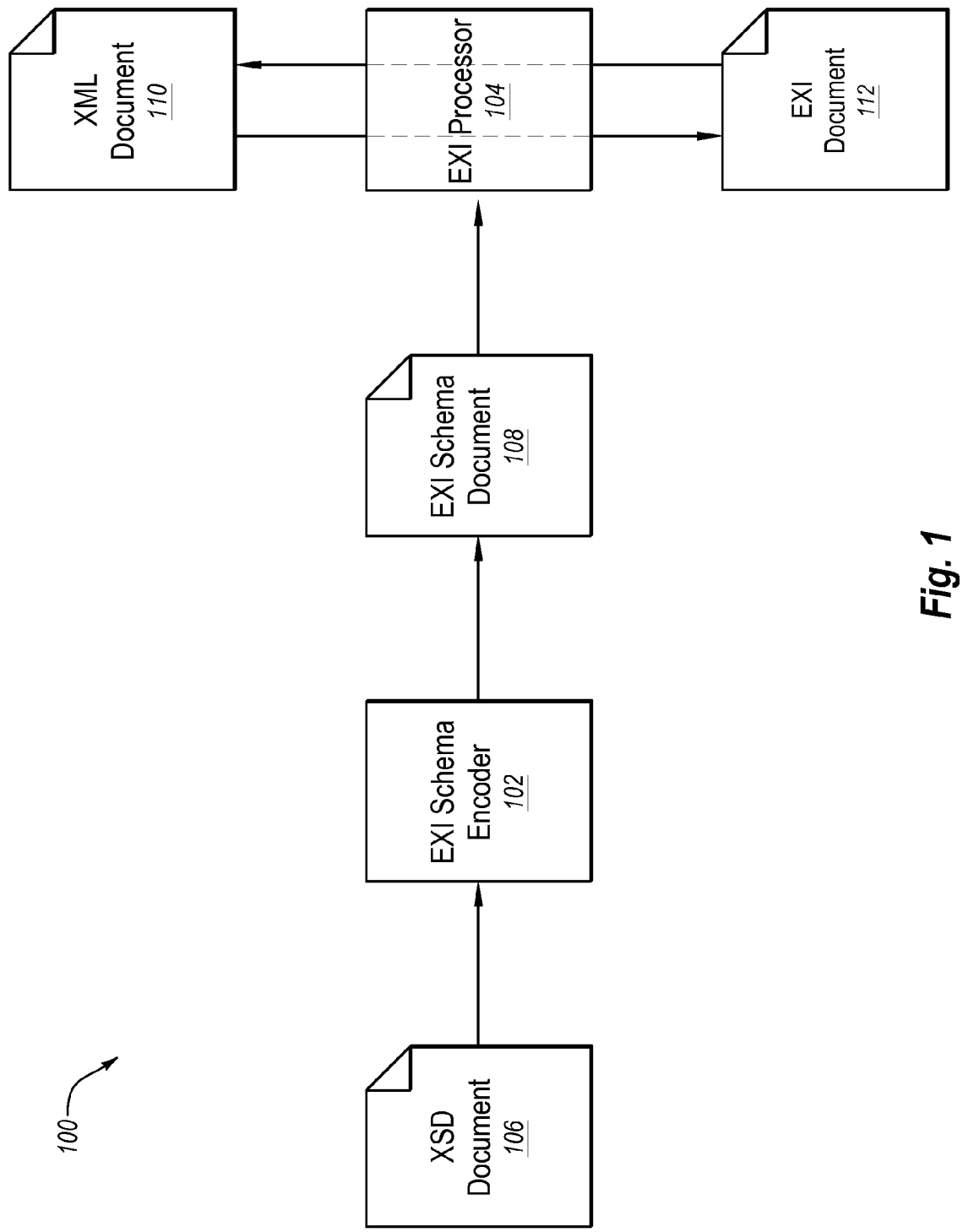
FIG. 1 is a block diagram of an example EXI processing system.

FIG. 1 is a block diagram of an example EXI processing system 100, arranged in accordance with at least some embodiments described herein. The EXI processing system 100 may include an EXI schema encoder 102 and an EXI processor 104. An example EXI schema encoder and an example EXI processor are included in the OpenEXI project hosted at SourceForge.net. The source code and documentation of the OpenEXI project as of the filing date of the present application are incorporated herein by reference in their entirety. The EXI schema encoder 102 is configured to receive as input an XSD document 106 and encode the XSD document 106 into an EXI schema document 108. For example, the EXISchemaFactory of the OpenEXI project may be employed as the EXI schema encoder 102. The EXI schema document 108 may then be received as input to the EXI processor 104 and used when converting between an associated XML document 110 and its corresponding EXI document 112. The EXI processor 104 may be employed in a device with limited memory or storage capacity.

Figure 2:
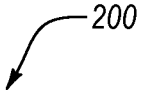
FIG. 2 illustrates an example EXI schema simpleType datatype according to at least some embodiments described herein.

FIG. 2 illustrates an example EXI schema simpleType datatype 200 according to at least some embodiments described herein. The example EXI schema datatype 200 may be employed by the EXI schema encoder 102 of FIG. 1 when encoding the XSD document 106 into the EXI schema document 108. In the illustrated embodiment, the EXI schema datatype 200 includes eight (8) fields that each occupies four (4) bytes in memory. Therefore, the EXI schema datatype 200 occupies thirty-two (32) bytes in memory (i.e. 8 fields×4 bytes=32 bytes) according to some embodiments. It is understood that the specific number of fields in the example EXI schema datatype 200 may differ in other embodiments from the number shown in FIG. 2. It is further understood that the number of bytes that each field occupies in memory in the example EXI schema datatype 200 may differ in other embodiments from the number shown in FIG. 2.

FIG. 3 illustrates a prior art EXI schema simpleType datatype 300. The prior art EXI schema simpleType datatype 300 includes twenty-three (23) fields that each occupies four (4) bytes in memory. Therefore, the prior art EXI schema simpleType datatype 300 occupies ninety-two (92) bytes in memory (i.e. 23 fields×4 bytes=92 bytes). Thus, the example EXI schema simpleType datatype 200 occupies 65% less memory space than the prior art EXI schema simpleType datatype 300 (i.e. 100%−32 bytes/92 bytes=65%). This reduction in the amount of memory occupied by the example EXI schema simpleType datatype 200 reduces the size of a simpleType element in an encoded EXI schema. This reduction in the amount of memory may generally be accomplished by eliminating various validation-specific facets from each simpleType element. The term "facet" as used herein refers to a facet as defined in the EXI Format 1.0 Specification.

For example, a comparison of the example EXI schema simpleType datatype 200 and the prior art EXI schema simpleType datatype 300 reveals that various facets may be eliminated from each simpleType element in an XSD document. Then, when the XSD document is encoded into an EXI schema document, the prior elimination of these facets may result in a reduction in the size of each simpleType element in the encoded EXI schema document. The encoded EXI schema document may then be utilized in any task other than XML validation. Examples of non-validation tasks include, but are not limited to, encoding an XML document into an EXI document, decoding an XML document from an EXI document, encoding an XML document into a Comma-Separated Values (CSV) document, a flat file document, or a JavaScript Object Notation (JSON) document; and decoding an XML document from a CSV document, a flat file document, or a JSON document.

As suggested by a comparison of the example EXI schema simpleType datatype 200 and the prior art EXI schema simpleType datatype 300, the eliminated facets may include length, minLength, maxLength, pattern, maxInclusive, maxExclusive, minExclusive, totalDigits, and fractionDigits for all varieties of simpleType elements. In addition, the eliminated facets may further include minInclusive for each simpleType element other than integer atomic variety simpleType elements that are a bounded integer. Moreover, the eliminated facets may further include whitespace for each simpleType element other than string atomic variety simpleType elements.

Figure 4:
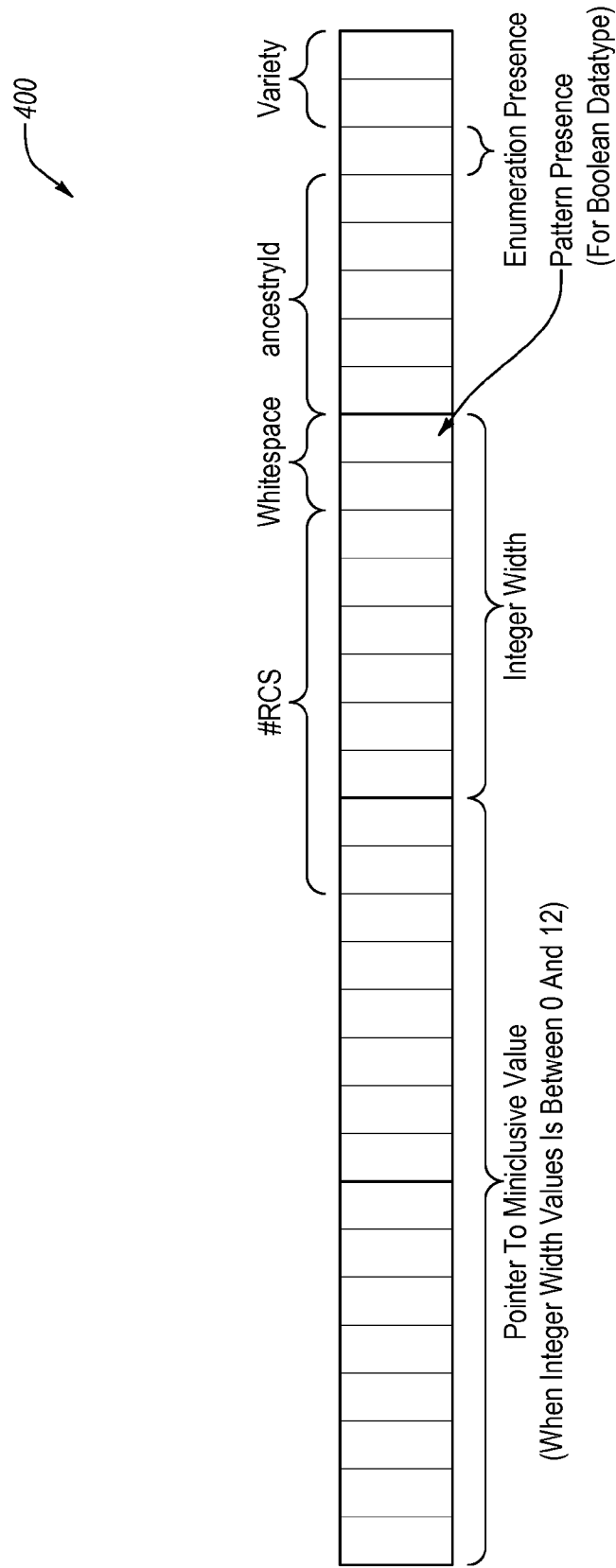
FIG. 4 illustrates an example layout of an auxiliary field in the example EXI schema datatype of FIG. 2.

Instead of outright elimination of a particular facet, the facet may instead be reduced in size and combined with other facets in a composite auxiliary field, thereby maintaining at least a portion of the facet value while still furthering the goal of an overall reduction in the size of the corresponding simpleType element. FIG. 4 illustrates an example layout 400 of the SIMPLE_TYPE_AUX field in the example EXI schema simpleType datatype 200 of FIG. 2. The example layout 400 includes thirty-two (32) bits that, depending on the variety of the simpleType element, are used as various data fields to encode corresponding data values. For example, the data fields of the example layout 400 may be used to encode at least a portion of various facet values, thereby reducing the amount of memory used by not storing the entire facet value.

For example, the example layout 400 includes a 2-bit variety field for all simpleType element varieties, including list, union, and atomic varieties. Where the simpleType element is any atomic variety, the example layout 400 further includes a 1-bit enumeration presence field and a 5-bit ancestry identifier field. Where the simpleType element is a boolean atomic variety, the example layout 400 further includes a 1-bit pattern presence field. Where the simpleType element is a string atomic variety, the example layout 400 further includes a 2-bit whitespace field and an 8-bit restricted characters field. Where the simpleType element is an integer atomic variety, the example layout 400 further includes an 8-bit integer width field and a 16-bit minInclusive pointer field. It is understood that the specific number of bits in each field in the example layout 400 in other embodiments may differ from the number shown in FIG. 4.

Figure 5A:
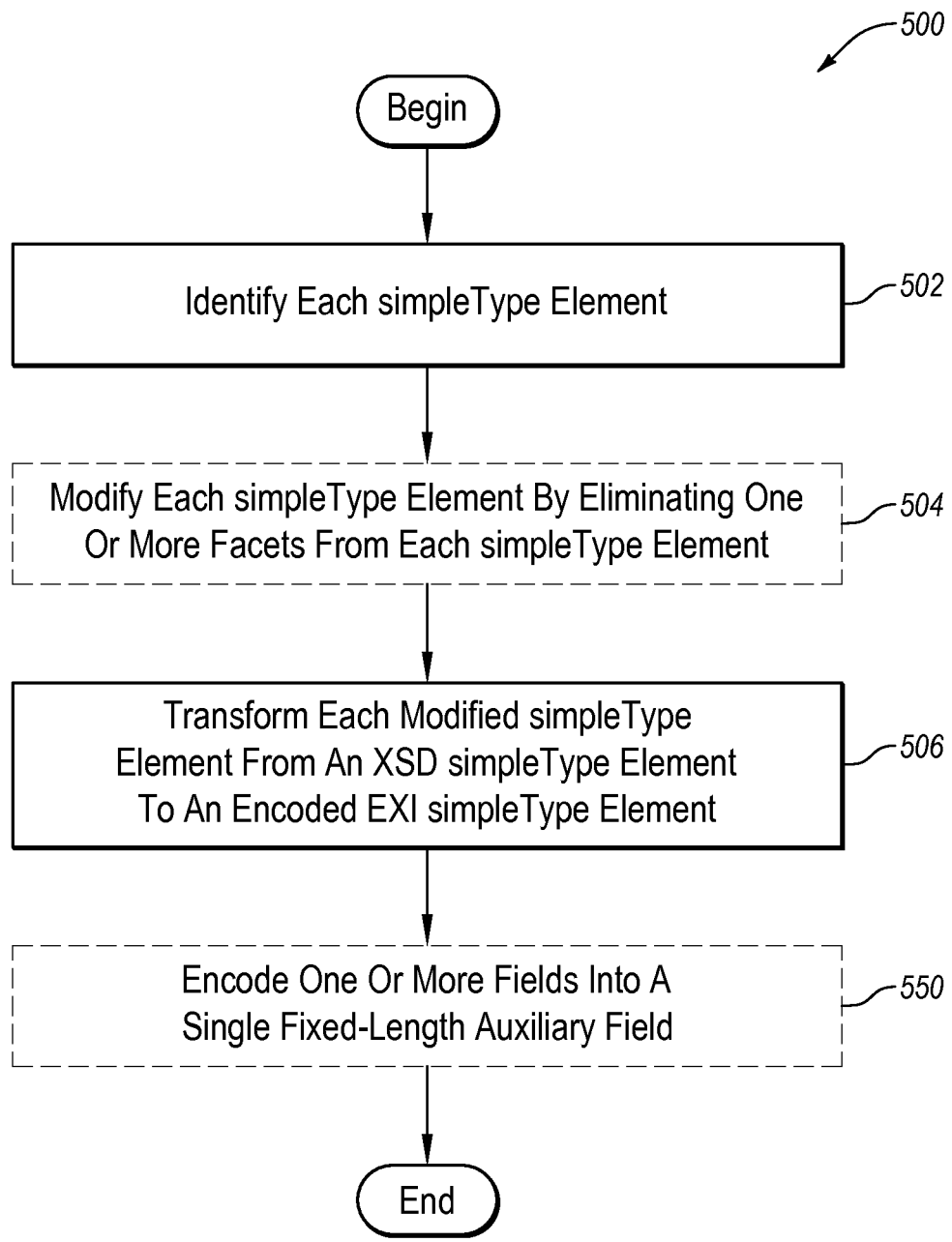
FIG. 5A is a flow chart of an example method of reducing the size of a simpleType element in an EXI schema document.

FIG. 5A is a flow chart of an example method 500 of reducing the size of a simpleType element in an EXI schema document, arranged in accordance with at least some embodiments described herein. The method 500 may be implemented, in some embodiments, by an EXI processing system, such as the example EXI processing system 100 of FIG. 1. For example, the EXI schema encoder 102 of the EXI processing system 100 of FIG. 1 may be configured to execute computer instructions to perform operations of reducing the size of a simpleType element from the XSD document 106 during the encoding of the simpleType element into the EXI schema document 108, as represented by one or more of blocks 502, 504, 506 and/or 550 of the method 500. Although illustrated as discrete blocks, various blocks may be divided into additional blocks, combined into fewer blocks, or eliminated, depending on the desired implementation. The method 500 will now be discussed with reference to both FIG. 5A and FIG. 1.

The method 500 may begin at block 502, in which each simpleType element in an XSD document is identified. For example, the EXI schema encoder 102 may parse through the XSD document 106 to identify each simpleType element in the XSD document 106.

In optional block 504, each simpleType element of the XSD document is modified by eliminating one or more facets from each simpleType element in the XSD document. For example, the EXI schema encoder 102 may eliminate one or more facets from each simpleType element in the XSD document 106. As noted above, in at least some example embodiments, these eliminated facets may include validation-specific facets from each simpleType element, such as those listed above.

In block 506, each modified simpleType element in the XSD document is transformed from an XSD simpleType element to an encoded EXI simpleType element. For example, the EXI schema encoder 102 may transform each modified simpleType element with start and end tags in the XSD document 106 to an encoded EXI simpleType element expressed as a sequence of bits in the encoded EXI schema document 108.

In optional block 550, one or more fields of each simpleType element in the XSD document are encoded into a single fixed-length auxiliary field in the encoded EXI simpleType element. For example, the EXI schema encoder 102 may encode one or more fields of each simpleType element in the XSD document 106 into a single fixed-length auxiliary field in the corresponding encoded EXI simpleType element in the encoded EXI schema document 108. The fixed-length auxiliary field may be the SIMPLE_TYPE_AUX field with the example layout 400 of FIG. 4.

Figure 5B:
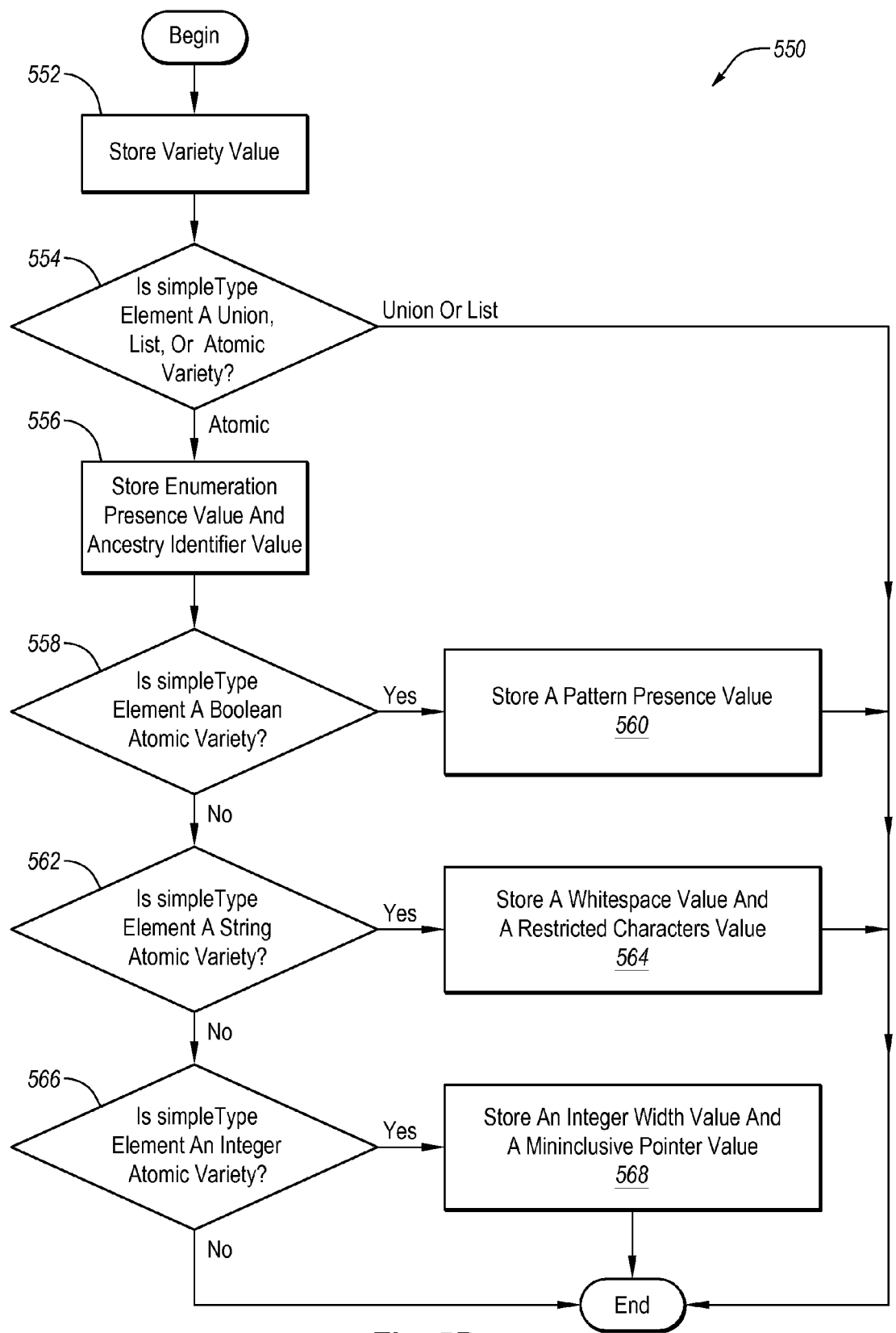
FIG. 5B is an expanded flow chart of an example method of one block of the example method of FIG. 5A.

FIG. 5B is an expanded flow chart of an example method of the block 550 (hereinafter the "method 550") of the example method 500 of FIG. 5A. The method 550 will now be discussed with reference to FIG. 5B, FIG. 1, and FIG. 4.

The method 550 may begin at block 552, in which the variety value of the simpleType element is stored. For example, the EXI schema encoder 102 may store the variety value of a simpleType element of the XSD document 106 in the 2-bit variety field of the example layout 400 in the EXI schema document 108.

In decision block 554, it is determined whether the simpleType element is a union, list, or atomic variety. If the simpleType element is a union or list variety ("Union or List" at decision block 504), then the method 550 is complete. If the simpleType element is an atomic variety ("Atomic" at decision block 504), then the method 550 proceeds to block 556. For example, the EXI schema encoder 102 may examine the variety of the simpleType element of the XSD document 106 to determine whether the simpleType element is a union, list, or atomic variety.

In block 556, an enumeration presence value and an ancestry identifier value of the simpleType element are stored. For example, the EXI schema encoder 102 may store the enumeration presence value of the simpleType element in the 1-bit enumeration presence field and the ancestry identifier value simpleType element in the 5-bit ancestry identifier field of the example layout 400 in the EXI schema document 108.

In decision block 558, it is determined whether the simpleType element is a boolean atomic variety. For example, the EXI schema encoder 102 may examine the variety of the simpleType element of the XSD document 106 to determine whether the simpleType element is a boolean atomic variety. If so ("Yes" at decision block 558), then the method 550 proceeds to block 560 where a pattern presence value is stored. For example, the EXI schema encoder 102 may store the pattern presence value of the simpleType element in the 1-bit pattern presence field of the example layout 400 in the EXI schema document 108. If not ("No" at decision block 558), then the method 550 proceeds to decision block 562.

In decision block 562, it is determined whether the simpleType element is a string atomic variety. For example, the EXI schema encoder 102 may examine the variety of the simpleType element of the XSD document 106 to determine whether the simpleType element is a string atomic variety. If so ("Yes" at decision block 562), then the method 550 proceeds to block 564 where a whitespace value and a restricted characters value are stored. For example, the EXI schema encoder 102 may store the whitespace value of the simpleType element in the 2-bit whitespace field and the restricted characters value of the simpleType element in the 8-bit restricted characters field of the example layout 400 in the EXI schema document 108. If not ("No" at decision block 562), then the method 550 proceeds to decision block 566.

In decision block 566, it is determined whether the simpleType element is an integer atomic variety. For example, the EXI schema encoder 102 may examine the variety of the simpleType element of the XSD document 106 to determine whether the simpleType element is an integer atomic variety. If so ("Yes" at decision block 566), then the method 550 proceeds to block 568 where an integer width value and a mininclusive pointer value are stored. For example, the EXI schema encoder 102 may store the integer width value of the simpleType element in the 8-bit integer width field and the mininclusive pointer value of the simpleType element in the 16-bit restricted characters field of the example layout 400 in the EXI schema document 108. 4. If not ("No" at decision block 566), then the method 550 is complete.

Figure 6:
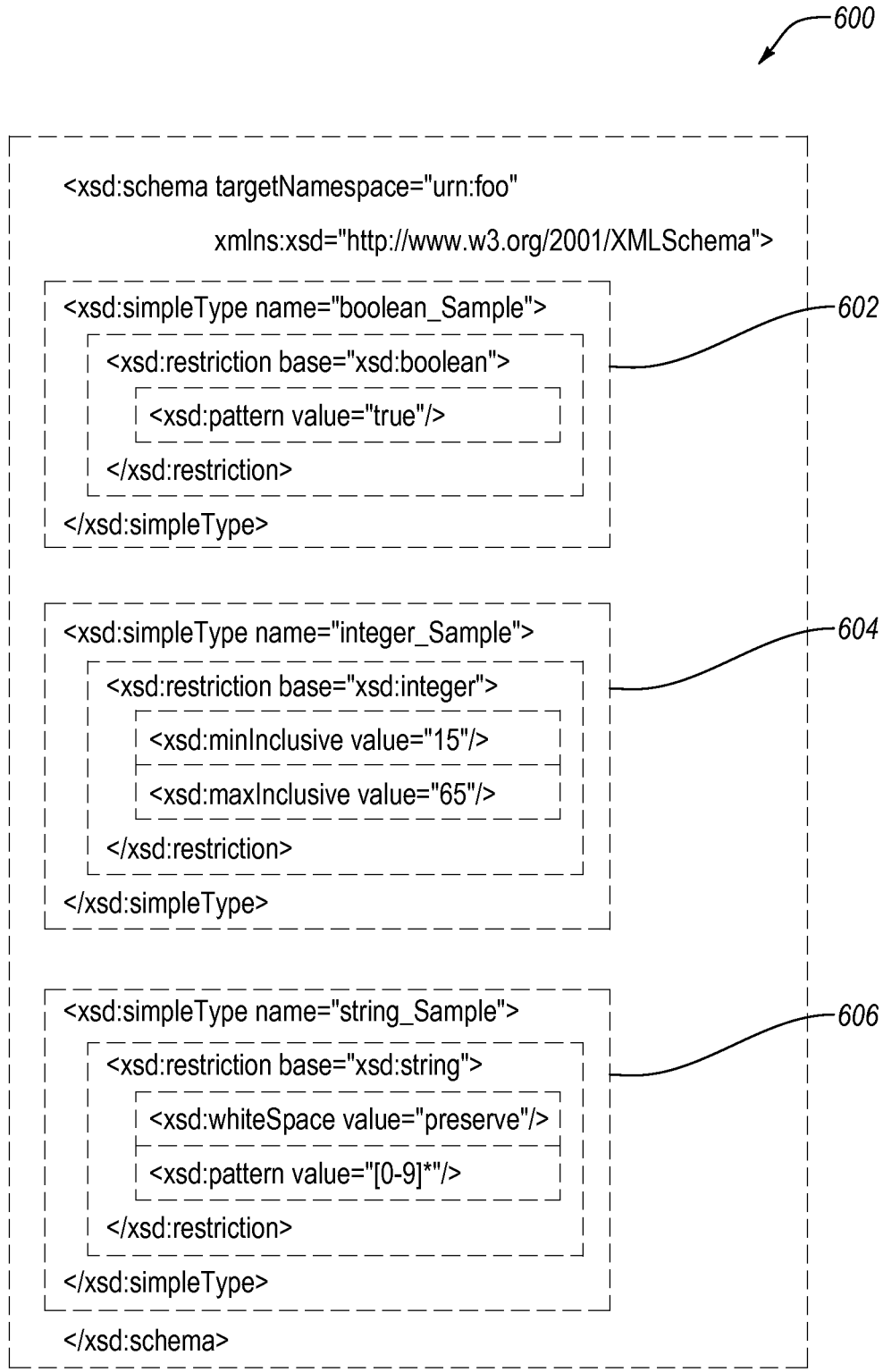
FIG. 6 illustrates an example XSD document.

FIG. 6 illustrates an example XML Schema Definition (XSD) document 600. The example XSD document 600 defines an atomic boolean simpleType element 602, an atomic integer simpleType element 604, and an atomic string simpleType element 606. Each of the simpleType elements 602, 604, and 606 is an XML element including start and end "xsd:simpleType" tags. The XSD document 600 is a plain-text human-readable document of ASCII text, where each ASCII character occupies one (1) byte in memory. Therefore, prior to be being encoded into an EXI schema document, such as the EXI schema document 108 of FIG. 1, the XSD document 600 occupies more than six-hundred-fifty (650) bytes in memory, with each of the individual simpleType elements 602, 604, and 606 occupying more than one-hundred-sixty (160) bytes in memory.

FIG. 7 illustrates the example atomic boolean simpleType element 602 of the XSD document 600 of FIG. 6 as an encoded simpleType element 700 according to the example EXI schema datatype 200 of FIG. 2. FIG. 8 illustrates the example atomic integer simpleType element 604 of the XSD document 600 of FIG. 6 as an encoded simpleType element 800 according to the example EXI schema datatype 200 of FIG. 2. FIG. 9 illustrates the example atomic string simpleType element 606 of the XSD document 600 of FIG. 6 as an encoded simpleType element 900 according to the example EXI schema datatype 200 of FIG. 2.

As illustrated in FIGS. 7, 8, and 9, each of the encoded simpleType elements 700, 800, and 900 occupy only thirty-two (32) bytes once encoded into an EXI schema document, such as the EXI schema document 108 of FIG. 1. Therefore, compared to the unencoded simpleType elements 602, 604, and 606 of the XSD document 600 of FIG. 6, which, as noted above, each occupies more than one-hundred-sixty (160) bytes in memory, each of the encoded simpleType elements 700, 800, and 900 occupies at least 80% less space in memory (i.e. 100%−32 bytes/160 bytes=80%).

FIGS. 10A-10C illustrate the example atomic string simpleType element 606 of the XSD document of FIG. 6 as an encoded simpleType element 1000 according to the prior art EXI schema datatype of FIG. 3. As illustrated in FIGS. 10A-10C, the encoded simpleType element 1000 occupies eighty-eight (88) bytes once encoded into an EXI schema document. Therefore, compared to the encoded simpleType element 900 of FIG. 9 which was encoded according to an example embodiment, the prior art encoded simpleType element 1000 of FIGS. 10A-10C occupies 2.75 times more space in memory.

Therefore, the embodiments disclosed herein include methods of reducing the size of a simpleType element in an EXI schema document where the EXI schema document is targeted for non-validation tasks. Because validation tasks employ validation-specific data fields of a simpleType element, where an EXI schema document is targeted for a non-validation task, the size of the simpleType element in the EXI schema document may be reduced by eliminating these validation-specific data fields. Thus, the embodiment disclosed herein allow for more efficient exchange of schema information which may be especially beneficial in devices with limited memory or storage capacity.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of reducing the size of a simpleType element in an Efficient XML Interchange (EXI) schema document, the method comprising:
   modifying each simpleType element in an XML Schema Definition (XSD) document by eliminating one or more validation-specific facets from each simpleType element; and
   encoding the XSD document into an EXI schema document by transforming each modified simpleType element in the XSD document from an XSD simpleType element with start and end tags to an encoded EXI simpleType element expressed as a sequence of bits,
   wherein each of the one or more validation-specific facets includes a facet employed to validate whether a document conforms to the XSD.

2. The method according to claim 1, further comprising utilizing the encoded EXI schema document in a task other than XML validation.

3. The method according to claim 1, further comprising utilizing the encoded EXI schema document in a task of encoding an XML document into an EXI document.

4. The method according to claim 1, further comprising utilizing the encoded EXI schema document in a task of decoding an XML document from an EXI document.

5. The method according to claim 1, further comprising utilizing the encoded EXI schema document in a task of encoding an XML document into a Comma-Separated Values (CSV) document, a flat file document, or a JavaScript Object Notation (JSON document).

6. The method according to claim 1, further comprising utilizing the encoded EXI schema document in a task of decoding an XML document from a Comma-Separated Values (CSV) document, a flat file document, or a JavaScript Object Notation (JSON) document.

7. The method according to claim 1, wherein:
   the eliminated one or more validation-specific facets include length, minLength, maxLength, pattern, maxInclusive, maxExclusive, minExclusive, totalDigits, and fractionDigits for all varieties of simpleType elements;
   the eliminated one or more validation-specific facets further include minInclusive for each simpleType element other than integer atomic variety simpleType elements that are a bounded integer; and the eliminated one or more validation-specific facets further include whitespace for each simpleType element other than string atomic variety simpleType elements.

8. A non-transitory computer-readable medium storing a program that causes a processor to execute the method according to claim 1.

9. A method of reducing the size of a simpleType element in an Efficient XML Interchange (EXI) schema document, the method comprising:

identifying each simpleType element in an XML Schema Definition (XSD) document;

encoding the XSD document into an EXI schema document by transforming each identified simpleType element in the XSD document from an XSD simpleType element with start and end tags to an encoded EXI simpleType element expressed as a sequence of bits, the encoding including, for each identified simpleType element, encoding the following fields into a single fixed-length auxiliary field:

a variety field for a union or list variety simpleType element;

a variety field, an enumeration presence field, an ancestry identifier field, and a pattern presence field for a boolean atomic variety simpleType element;

a variety field, an enumeration presence field, an ancestry identifier field, a whitespace field, and a restricted characters field for a string atomic variety simpleType element;

a variety field, an enumeration presence field, an ancestry identifier field, an integer width field, and a minInclusive pointer field for an integer atomic variety simpleType element; or a variety field, an enumeration presence field, and an ancestry identifier field for any other atomic variety simpleType element.

10. The method according to claim 9, wherein the length of the single fixed-length auxiliary field is 4 bytes.

11. The method according to claim 10, wherein:

each variety field and each whitespace field has a length of 2 bits;

each enumeration presence field and each pattern presence field has a length of 1 bit;

each ancestry identifier field has a length of 5 bits;

each restricted characters field has a length of 8 bits;

each integer width field has a length of 8 bits; and each minInclusive pointer field has a length of 16 bits.

12. The method according to claim 9, further comprising utilizing the encoded EXI schema document in a task other than XML validation.

13. The method according to claim 12, further comprising utilizing the encoded EXI schema document in a task of encoding an XML document into an EXI document, a Comma-Separated Values (CSV) document, a flat file document, or a JavaScript Object Notation (JSON) document.

14. The method according to claim 12, further comprising utilizing the encoded EXI schema document in a task of decoding an XML document from an EXI document, a Comma-Separated Values (CSV) document, a flat file document, or a JavaScript Object Notation (JSON) document.

15. The method according to claim 12, further comprising eliminating one or more facets from each identified simpleType element in the XSD document prior to encoding the XSD document into an EXI schema document.

16. The method according to claim 14, wherein:

the eliminated one or more facets include length, minLength, maxLength, pattern, maxInclusive, maxExclusive, minExclusive, totalDigits, and fractionDigits for all varieties of simpleType elements;

the eliminated one or more facets further include minInclusive for each simpleType element other than integer atomic variety simpleType elements that are a bounded integer; and the eliminated one or more facets further include whitespace for each simpleType element other than string atomic variety simpleType elements.

17. A non-transitory computer-readable medium storing a program that causes a processor to execute the method according to claim 9.

18. A system including:

a non-transitory computer-readable medium storing a program; and an Efficient XML Interchange (EXI) schema encoder including a processor configured to execute the program, the program configured to cause the processor to execute a method of reducing the size of a simpleType element in an Efficient XML Interchange (EXI) schema document, the method comprising:

modifying each simpleType element in an XML Schema Definition (XSD) document by eliminating one or more facets from each simpleType element;

encoding the XSD document into an EXI schema document by transforming each modified simpleType element in the XSD document from an XSD simpleType element with start and end tags to an encoded EXI simpleType element expressed as a sequence of bits, the encoding including, for each modified simpleType element, encoding the following fields into a single fixed-length auxiliary field:

a variety field for a union or list variety simpleType element;

a variety field, an enumeration presence field, an ancestry identifier field, and a pattern presence field for a boolean atomic variety simpleType element;

a variety field, an enumeration presence field, an ancestry identifier field, a whitespace field, and a restricted characters field for a string atomic variety simpleType element;

a variety field, an enumeration presence field, an ancestry identifier field, an integer width field, and a minInclusive pointer field for an integer atomic variety simpleType element; or a variety field, an enumeration presence field, and an ancestry identifier field for any other atomic variety simpleType element.

19. The system according to claim 18, wherein:

the eliminated one or more facets include length, minLength, maxLength, pattern, maxInclusive, maxExclusive, minExclusive, totalDigits, and fractionDigits for all varieties of simpleType elements;

the eliminated one or more facets further include minInclusive for each simpleType element other than integer atomic variety simpleType elements that are a bounded integer; and the eliminated one or more facets further include whitespace for each simpleType element other than string atomic variety simpleType elements.

20. The system according to claim 18, wherein the auxiliary field has a length of 4 bytes and includes:

a 2-bit variety field for a union or list variety simpleType element;

a 2-bit variety field, a 1-bit enumeration presence field, a 5-bit ancestry identifier field, and a 1-bit pattern presence field for a boolean atomic variety simpleType element;

a 2-bit variety field, a 1-bit enumeration presence field, a 5-bit ancestry identifier field, a 2-bit whitespace field, and an 8-bit restricted characters field for a string atomic variety simpleType element;

a 2-bit variety field, a 1-bit enumeration presence field, a 5-bit ancestry identifier field, a 8-bit integer width field, and a 16-bit minInclusive pointer field for an integer atomic variety simpleType element; or a 2-bit variety field, a 1-bit enumeration presence field, and a 5-bit ancestry identifier field for any other atomic variety simpleType element.

* * * * *